Nov. 14, 1933.                R. THOMAS                1,935,167
                          WELDING TORCH MIXER
                       Original Filed Dec. 31, 1929
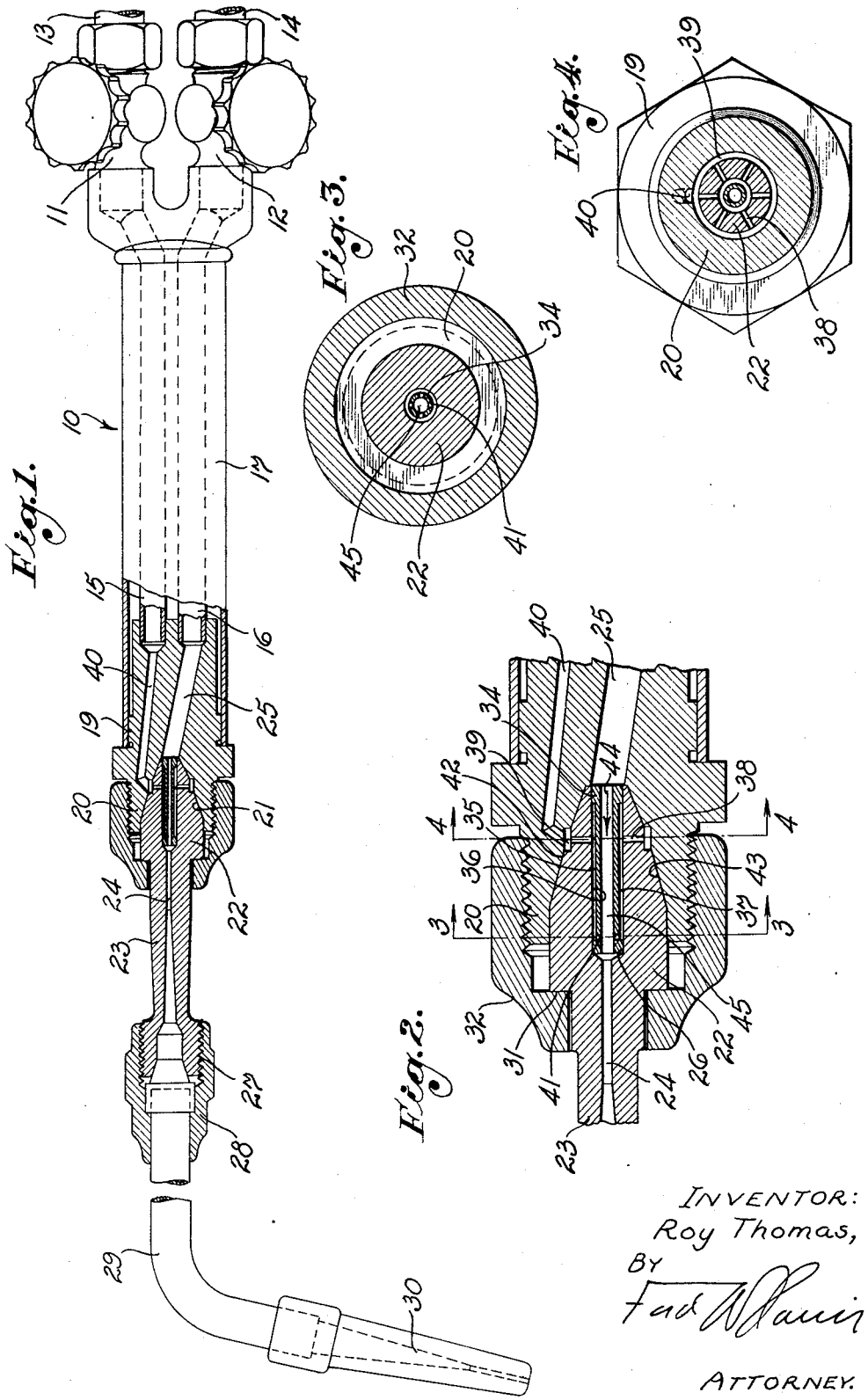
INVENTOR:
Roy Thomas,
BY
Fad W Lewis
ATTORNEY.

Patented Nov. 14, 1933

1,935,167

UNITED STATES PATENT OFFICE 1,935,167

WELDING TORCH MIXER

Roy Thomas, Los Angeles, Calif.

Original application December 31, 1929, Serial No. 417,672. Divided and this application November 11, 1932. Serial No. 642,206

1 Claim. (Cl. 158—27.4)

This application is a division of the subject-matter disclosed in my copending application Serial No. 417,672, filed December 31, 1929, for Welding torch mixer.

My invention relates to torches in which a combustible gas is mixed with a combustion supporting gas, such as oxygen, so as to produce a flame of extremely high temperature which may be employed for the fusion of metals or other high fusion point substances, and relates particularly to a mixer for the mixing of gases employed in a torch of the above character.

It is an object of the invention to provide a mixer capable of handling relatively large quantities of gases so that ample heat may be generated in the flame produced by the torch without liability of backfire carrying through the torch into the hose members through which gases for operation of the torch are carried.

Another object of the invention is to provide a mixer so constructed that flash-back flames will be extinguished therein so that danger of the flash-back being carried into the hose is avoided.

A further object of the invention is to provide a mixer having a relatively large centralized gas passage and a surrounding oxygen passage having such formation that flash-back flames will be extinguished therein, this oxygen passage being connected with the gas passage in such a manner as to form jets having an injector action. By the use of my novel mixing construction, relatively low gas pressure may be employed, and a perfect mixture of the gases may be attained.

A further object of the invention is to provide a mixer so constructed as to extingush flash-back flames therein but being of such construction that the heat of such flash-back flames is rapidly dissipated so as to prevent rapid heating of the mixer parts to such degree that the pre-ignition of the gas mixture will take place within the mixer.

Further objects and advantages of the invention will be made evident throughout the following part of the specification.

Referring to the drawing, which is for illustrative purposes only:

Fig. 1 is a partly sectioned elevational view of a welding torch employing my new mixer.

Fig. 2 is an enlarged fragmentary longitudinal section showing the details of the mixer construction.

Fig. 3 is a section on a plane represented by the line 3—3 of Fig. 2.

Fig. 4 is a section on a plane represented by the line 4—4 of Fig. 2.

In order to disclose the utility of my invention, I have shown in Fig. 1 a torch 10 having an oxygen valve 11 and an acetylene valve 12 adapted to be connected respectively with hose members 13 and 14 and with tubes 15 and 16 within the handle 17 of the torch 10, through which tubes the oxygen and acetylene are carried to a head fixture 19 at the front end of the handle. The outer end of the fixture 19 is in the form of a threaded projection 20 and has an outwardly diverging conical recess 21 therein adapted to receive the plug portion 22 of an extension member 23 forming a part of my new mixer. The extension member 23 is provided with a gas passage 24 which communicates at its rearward end with a passage 25 in the head fixture 19 which in turn connects with the gas delivery tube 16. The plug portion 22 of the extension member 23 is formed with a counterbore 26 which is concentric with the gas passage 24.

The extension member 23 is threaded at 27 so that, by means of a nut 28, a neck member, such as indicated at 29, may be secured thereto. In the illustration of the torch I have shown a welding tip 30 secured to the downwardly bent end of the member 29.

As best shown in Fig. 2, the extension 23 at its point of junction with the plug portion 22 provides a shoulder 31 which constitutes the outer radial face of the plug. The outer radial face of the plug is engaged by a nut 32 which screws upon the threaded portion 20 of the head fixture 19 in such a manner as to hold the extension member 23 in position upon said head fixture.

A thin walled tube or sleeve 34 having its circumferential portion turned down to reduced diameter intermediate its ends is adapted to be fitted within the counterbore 26. The diameter of the counterbore is of such magnitude that an annular oxygen passage or space 35 is formed between the wall 36 of the counterbore 26 and the outer wall 37 of the tube or sleeve 34, this annular space being of greater length than its mean diameter, being connected through a plurality of radially drilled holes 38 with an annular space 39 which is connected through an oxygen passage 40 in the head fixture 19 with the oxygen delivery tube 15 and having its forward end communicating with the gas passage 24 through radially disposed holes 41. The annular space 39 is formed approximately half within the conical wall 42 of the plug 22 and half within the conical wall 43 of the head fixture 19, this being accomplished by cutting co-operating grooves in the walls 42 and 43 of the plug 22 and head fixture 19 in substantially the manner shown.

A feature of my new mixer construction is that the gas passage 24 is centralized and is in alignment with the gas passage 25, this being contrary to customary construction which employs a centralized oxygen passage through which the oxygen is fed under pressure and to which flow of oxygen the combustible gas, preferably acetylene, is fed through diagonal jet openings. My new construction permits a relatively large quantity of gas to flow through the passage 24, as indicated by the arrow 44 of Fig. 2, this gas passing through the torch structure to the tip 30 thereof. Oxygen for supporting combustion in the gas passes through the passage 40 into the annular space 39 from whence it then passes through the plurality of holes 38 into the annular space 35 wherein it passes forward to the front end of the space 35, then passes through the jet openings 41 inwardly into the bore 45 of the tube 34 and into the flow of gas within the passage 24, intermixing therein with the gas and accomplishing an injector effect which increases the velocity of the gas and oxygen mixture toward the tip 30 of the torch.

When flash-back occurs, the flame travels rapidly back through the neck 29 of the extension 23 to the mixer, wherein the flash-back flame divides, a part thereof carrying rearwardly within the passage 24 and bore 45 toward the passage 25, and the remaining portion thereof carrying through the jet openings 41 into the annular space 35 wherein it is extinguished. When flashback occurs, a small amount of gas is carried back from the passage 24 into the bore 45 of the tube 34 beyond the position of the oxygen openings 41, carrying therewith a small amount of oxygen which rapidly intermixes with the combustible gas so that a mixture is formed containing insufficient oxygen to support combustion, the result being that the portion of the flash-back which carries back in the passage 24 toward, and possibly into, the passage 25, immediately burns out, or, in other words, is extinguished. The flash-back flame which passes through the openings 41 into the space 35 containing pure oxygen carries therewith a small amount of combustible gas which, under ordinary circumtancess, will burn completely in the presence of oxygen but which in my improved construction is extinguished in the space 35.

The flash-back extinguishing results are accomplished in what I desire to term the extinguishing space 35, due to the characteristic and peculiar formation of this space. It will be noted that the radial height or thickness of the annular space 35, or, in other words, the distance between the outer surface of the tube 34 and the inner surface or wall of the counterbore 26, is very small. In other words, it is just sufficient to provide sufficient area for passage of all of the oxygen which may be forced under pressure through the jet openings 41. It will be recognized, therefore, that the radial height of the passage 35 may be made considerably less than the diameter of the openings 41 and yet maintain therein an area of cross-section equal to the cumulative area of the openings 41. It is believed that when the oxygen side of the flash-back flame enters the space 35, it is flattened out in the small space thereby provided, and its heat is absorbed by the large area of wall surface presented to the space 35, the result being that the combustion cannot be then further supported.

By having the jet openings 41 lead from an oxygen passage of relatively small height or thickness and of correspondingly large width, I am enabled to form a passage through which combustion will not carry, in this manner effectually extinguishing flash-back which might otherwise carry into the oxygen passages of the torch and into the oxygen hose member 13.

The extension 23 and the tube 34 are preferably constructed of copper. The heat of the flashback is very quickly dissipated through the plug portion 22 of the extension 23 which surrounds the counterbore 26 and those portions of the head fixture 19 with which it engages. The rapid dissipation of heat due to this construction prevents heating of the mixing structure to such a degree that the pre-ignition will take place in the torch. Therefore, by use of my new mixer I am enabled to substantially eliminate the very undesirable rapid fire-back action encountered in the use of many welding torches of standard construction.

In these illustrations I have shown preferred proportions of the extinguishing passage 35 and the openings 41 and 38. These proportions may be varied within reasonable limits to suit the pressure and quantity of oxygen necessary to produce perfect combustion of the combustible gas employed by the torch. For instance, in torches of extremely large size, the central passage 24 will be increased and the mean diameter of the extinguishing passage 35 will likewise be increased so that a corresponding increase in area may be obtained therein. The length of the passage 35 and its thickness may also be varied in accordance with existing conditions without departing from the valuable features of construction of the invention.

In this form of the invention radial jet openings 41 are shown communicating between the extinguishing passage 35 and the passage 24, it being found that the non-flash-back characteristics of my new construction are not affected by the angle at which the jet openings 41 or the openings 38 are drilled.

Although I have herein shown my invention in simple and practical form, it is recognized that certain parts or elements thereof are representative of other parts, elements, or mechanisms, which may be employed in substantially the same manner to accomplish substantially the same result; therefore it is to be understood that the invention is not to be limited to the details disclosed herein but shall have the scope of the following claim.

I claim as my invention:

A mixer construction for use with a torch handle having a recess in one end, including: a member having a gas passage therethrough and a tapered portion seating against the wall of said recess; securing means connected to said torch handle and retaining said tapered portion of said member in said recess; and an inner member having a gas passage therethrough and having enlarged end portions, said inner member being disposed in said gas passage of said member so as to define between said enlarged end portions and between said inner member and the wall of said gas passage in said member an oxygen chamber of small radial thickness and greater length for the extinguishment of flash-back flame, said member having an oxygen delivery passage connecting one part of said oxygen chamber to an oxygen source, and said inner member having jet openings connecting another part of said oxygen chamber to said gas passage.

ROY THOMAS.